US010048573B2

(12) United States Patent
Otani (10) Patent No.: US 10,048,573 B2
(45) Date of Patent: Aug. 14, 2018

(54) PROJECTOR SYSTEM AND IMAGING DEVICE

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/711,236

(22) Filed: Sep. 21, 2017

(65) Prior Publication Data

US 2018/0088447 A1    Mar. 29, 2018

(30) Foreign Application Priority Data

Sep. 29, 2016 (JP) .................. 2016-190770

(51) Int. Cl.
*G03B 21/14* (2006.01)
*H04N 9/31* (2006.01)
*G03B 21/00* (2006.01)
*G03B 21/56* (2006.01)

(52) U.S. Cl.
CPC ......... *G03B 21/005* (2013.01); *G03B 21/003* (2013.01); *G03B 21/56* (2013.01); *H04N 9/315* (2013.01); *H04N 9/3105* (2013.01); *H04N 9/3108* (2013.01)

(58) Field of Classification Search
CPC .... G03B 21/14; G03B 21/142; G03B 21/147; H04N 9/31; H04N 9/3102; H04N 9/3108; H04N 9/3185
See application file for complete search history.

(56) References Cited

U.S. PATENT DOCUMENTS

| | | | |
|---|---|---|---|
| 7,095,568 B2 * | 8/2006 | Kobayashi | G02B 5/005 355/71 |
| 8,696,140 B2 | 4/2014 | Tanaka | |
| 9,039,195 B2 | 5/2015 | Tanaka | |
| 9,091,906 B2 | 7/2015 | Tanaka | |
| 2005/0036216 A1* | 2/2005 | Lee | G02B 5/005 359/738 |
| 2011/0007283 A1 | 1/2011 | Tanaka | |
| 2013/0038524 A1 | 2/2013 | Otsuki et al. | |
| 2014/0176917 A1 | 6/2014 | Tanaka | |
| 2015/0172555 A1 | 6/2015 | Tanaka | |
| 2018/0088688 A1* | 3/2018 | Otani | G06F 3/03542 |

FOREIGN PATENT DOCUMENTS

| | | |
|---|---|---|
| JP | 2011-017894 A | 1/2011 |
| JP | 2013-038626 A | 2/2013 |

* cited by examiner

*Primary Examiner* — William C Dowling
(74) *Attorney, Agent, or Firm* — Oliff PLC (57) ABSTRACT

In an imaging section (imaging device), optical filters constituting an optical filter device are inserted and extracted, and an aperture varies an f-number in accordance with the insertion and the extraction of the optical filters. Thus, during the writing operation to the surface of the projection screen, namely during the interactive projector operation, entering of the light in the wavelength band other than that of the detected light DL is suppressed while capturing the detected light DL with the necessary light intensity, and during an alignment (a calibration), the axial chromatic aberration caused by the difference in wavelength band between the pattern image light GL as the image light and the detected light DL is suppressed to achieve an improvement in accuracy.

10 Claims, 9 Drawing Sheets

PROJECTOR SYSTEM AND IMAGING DEVICE

BACKGROUND

1. Technical Field

The present invention relates to a projector system for realizing a so-called interactive projector, which detects a pen tip or the like located on a projection screen and reflects the result on the content of a projection image to thereby make writing possible, and an imaging device applicable to the projector system.

2. Related Art

As an interactive projector, there has been known what detects infrared light emitted from a pointing device for pointing, for example, a projection screen with an imaging device, and at the same time identifies the light emitting position on the projection screen of the infrared light to thereby achieve such an interactive function as described above (see, e.g., JP-A-2013-38626 (Document 1)). Incidentally, such an interactive projector can only be realized on the premise that an alignment (calibration) for identifying the light emitting position of the infrared light representing the position of the pen tip held by the user on the projection screen. However, if it is attempted to associate the image position of a pattern image from the projector projected with, for example, visible light with the light emitting position of the infrared light from the pointing device based on imaging information obtained by the imaging device attached to the projector, it becomes necessary to make the imaging device so high in performance as to be able to suppress the chromatic aberration in a broad wavelength band so that both of the visible light and the infrared light can be captured without blurs and so on. It should be noted that in the case of attempting to suppress defocusing in the imaging element by inserting a glass substrate or the like as a substitution when retracting the optical filter from the light path as in Document 1, there is a possibility that the focal position is not aligned in other positions than on the optical axis to cause blurs although the focal position is adjusted to be aligned on the optical axis, for example.

SUMMARY

An advantage of some aspects of the invention is to provide a projector system capable of achieving an improvement in accuracy of an alignment (calibration) for making writing possible with a simple configuration when realizing an interactive projector, and an imaging device applicable to the projector system.

A projector system according to an aspect the invention includes a projection main unit adapted to project image light obtained by modulating light from a light source, and an imaging section having an optical filter, which can be inserted and extracted, adapted to reduce the image light from the projection main unit and transmit detected light in a wavelength band other than a wavelength band of the image light, and an aperture adapted to change an f-number in accordance with the insertion and the extraction of the optical filter.

In the projector system described above, since the optical filters are inserted and extracted in the imaging section, entering of the light in the wavelength band other than that of the detected light is suppressed while capturing, for example, the detected light with the necessary light intensity to thereby ensure the writing operation to the surface of the projection screen, namely the interactive projector operation. On this occasion, by the aperture varying the f-number in accordance with the insertion and the extraction of the optical filters, it is possible to suppress the axial chromatic aberration caused by the difference in wavelength band between the image light and the detected light to thereby achieve an improvement in accuracy of an alignment (a calibration).

In a specific aspect of the invention, the projector system further includes a projector control section adapted to identify an image projection position based on information of image light obtained by the imaging section, and a light emitting position of the detected light detected by the imaging section, and perform control of image projection based on a positional relationship identified. In this case, it becomes possible to perform the interactive projector operation such that the projector control section associates the image projection position and the light emitting position with each other, and detects the position of the pen tip or the like emitting the light to write the movement of the pen tip on the surface of the projection screen. It should be noted that regarding the projector control section, there can be cited a variety of configurations such as a configuration in which the PC connected to the projection main unit functions as the projector control section besides the case in which the projector control section is incorporated in the projection main unit.

In another aspect of the invention, the projection main unit performs image projection reflecting information of the light emitting position of the detected light detected by the imaging section. In this case, by reflecting the information of the light emitting position of the detected light, the interactive projector operation of performing writing on the projection screen based on the light emitting position of the detected light becomes possible.

In another aspect of the invention, the projection main unit projects the image light adapted to project a pattern image, and performs a calibration adapted to associate pixels of light modulation of modulating the light from the light source and pixels of a light receiving element of the imaging section with each other based on information of the imaging section receiving the image light of the pattern image. In this case, by performing such a calibration as described above, association related to the positions of the image for performing the interactive image projection is achieved.

In still another aspect of the invention, the aperture increases the f-number at the time of imaging the image light of the pattern image in the calibration to be larger than the f-number at the time of detecting the detected light in the image projection. It should be noted that here, the image projection does not mean use other than the normal use by the user such as the projection of the pattern image for the calibration, but means the actual use (ordinary use) by the user to actually make the device project a desired image and so on. In this case, in the calibration, by setting the f-number to a relatively large number, the axial chromatic aberration is suppressed, and it is possible for the imaging section to increase the depth of field, namely make the blur difficult to occur, to set the state in which the focus is achieved throughout the entire range where the pattern image is taken when capturing the projection light in the calibration, and even in the case in which the projection distance in the image projection by the projection main unit is dramatically varied by the image position (the focal distance varies by the position from the viewpoint of the imaging section) such as the proximity projection, it is possible to suppress the blur when taking the pattern image to there by achieve high resolution. In contrast, during the image projection, by setting the f-number to a relatively small value, namely by increasing the intensity of the light which can be captured, it is possible to reliably detect the detected light such as the infrared light. It should be noted that it is arranged that the entire irradiation area with the projection light can be imaged in the state in which the focus is achieved by, for example, optimizing the optical design.

In still another aspect of the invention, the aperture is a variable aperture adapted to vary an aperture value between the image light and the detected light. In this case, by moving the variable aperture between the case of transmitting the image light and the case of transmitting the detected light, the f-number can be varied.

In still another aspect of the invention, the aperture is a fixed aperture adapted to shield light in the wavelength band of the image light and transmit light in the wavelength band of the detected light. In this case, by making the passing range different between the image light and the detected light in the fixed aperture, the f-number can be varied.

In still another aspect of the invention, the imaging section detects light in an infrared wavelength band as the detected light in the wavelength band other than the wavelength band of the image light. In this case, it is possible to make the light other than the image light be detected as the detected light using the light in the infrared wavelength band.

In still another aspect of the invention, the optical filter is a visible light cut filter inserted in the image projection, and adapted to shield the image light and transmit the detected light. In this case, the image light is cut by the visible light cut filter to thereby reliably capture the detected light.

An imaging device according to an aspect of the invention is an imaging device adapted to take an image of image light adapted to project a pattern image, and an image of detected light in a wavelength band other than a wavelength band of the image light, the imaging device including an optical filter, which can be inserted and extracted, adapted to reduce the image light and transmit the detected light, and an aperture adapted to vary an f-number in accordance with the insertion and extraction of the optical filter.

In the imaging device described above, by inserting and extracting the optical filters, it is possible to suppress entering of the light in a wavelength band other than that of the detected light while capturing, for example, the detected light with the necessary light intensity. On this occasion, by the aperture varying the f-number in accordance with the insertion and the extraction of the optical filters, it is possible to suppress the axial chromatic aberration caused by the difference in wavelength band between the image light and the detected light. Therefore, by installing the imaging device to a projector performing writing to, for example, the surface of the projection screen, namely an interactive projector, it is possible to achieve an improvement inaccuracy of an alignment (a calibration). Further, by inserting and extracting the optical filters in accordance with the change in the f-number in the aperture, it is possible to suppress entering of the light in a wavelength band other than that of the detected light while capturing, for example, the detected light with the necessary light intensity.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

An imaging device and a projector system incorporating the imaging device according to a first embodiment of the invention will hereinafter be described with reference to the accompanying drawings.

Figure 1:
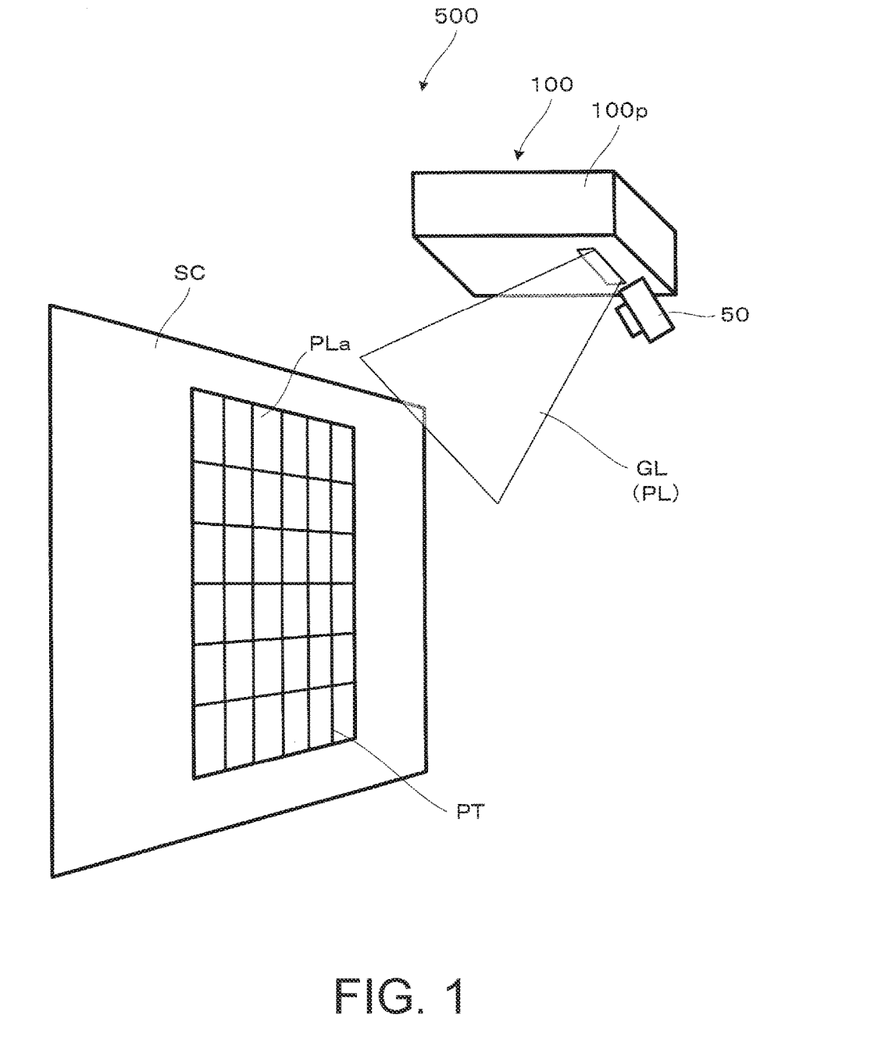
FIG. 1 is a diagram showing a schematic configuration of a projector system according to a first embodiment, and is a diagram showing an appearance of projection of a pattern image in the calibration.

The projector system 500 shown in FIG. 1 and so on is formed of a projector 100 for projecting projection light PL to perform image projection. It should be noted that an irradiation target area PLa of the projection light PL is formed on, for example, a screen SC. Further, although not shown in the drawings, the projector system 500 is constituted by, for example, PC connected thereto besides the projector 100, and makes the image operation possible in an interactive situation in which writing on the display screen in the irradiation target area PLa is accepted due to the PC performing a variety of processes as needed. In the projector system 500, the projector 100 is a short throw projector installed obliquely above the screen SC and for performing proximity projection toward the screen SC located obliquely below, and is constituted by a projection main unit 100p as a main body part for performing the image projection and the imaging section (or the imaging device) 50.

Figure 6:
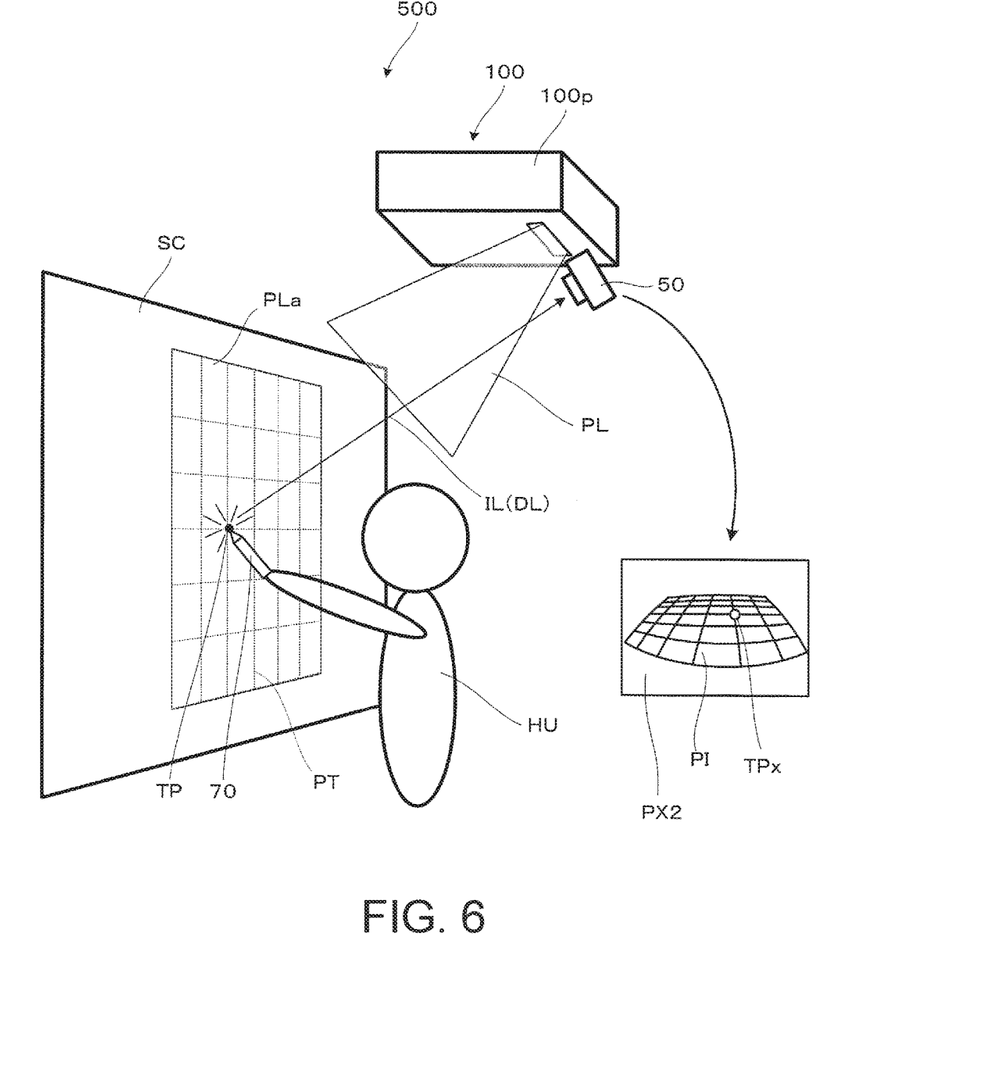
FIG. 6 is a diagram showing an appearance of image projection in an interactive situation.

As shown in FIG. 1 or FIG. 6, the projection main unit 100p project the projection light PL, which is image light formed by combining light beams in the visible wavelength band with each other, toward the screen SC to thereby perform formation of a projection image (a color image). It should be noted that FIG. 1 shows the appearance of the projection of a pattern image when performing a calibration, which is a process of an alignment as a premise for making so-called interactive image projection possible, in particular, in the image projection by the projection main unit 100p, and FIG. 6 shows the appearance of the image projection in the interactive situation as an example of the image projection in an actual use performed after the calibration. In the present embodiment, firstly as illustrated in FIG. 1, it is assumed that the pattern image PT representing the range of the picture reflected on the screen SC by the image projection by the projection main unit 100p is projected here with pattern image light GL formed of the light in a green wavelength band out of the component of the visible wavelength band included in the projection light PL as the image light. In the imaging section 50 (or the imaging device 50), by receiving some components of the pattern image light GL, the image information related to the pattern image PT is obtained, and identification of the image projection position is achieved based on the information. Further, as illustrated in FIG. 6, on the screen SC, or in the vicinity of the screen SC, infrared light (i.e., the light in a wavelength band other than the wavelength band of the projection light PL) is emitted from a tip part TP of a pen 70 held by the user HU besides the projection light PL described above, and a part of the infrared light is detected by the imaging section 50 (hereinafter referred to as detected light), and thus, the pointing position on the screen by the user HU is identified.

Figure 2:
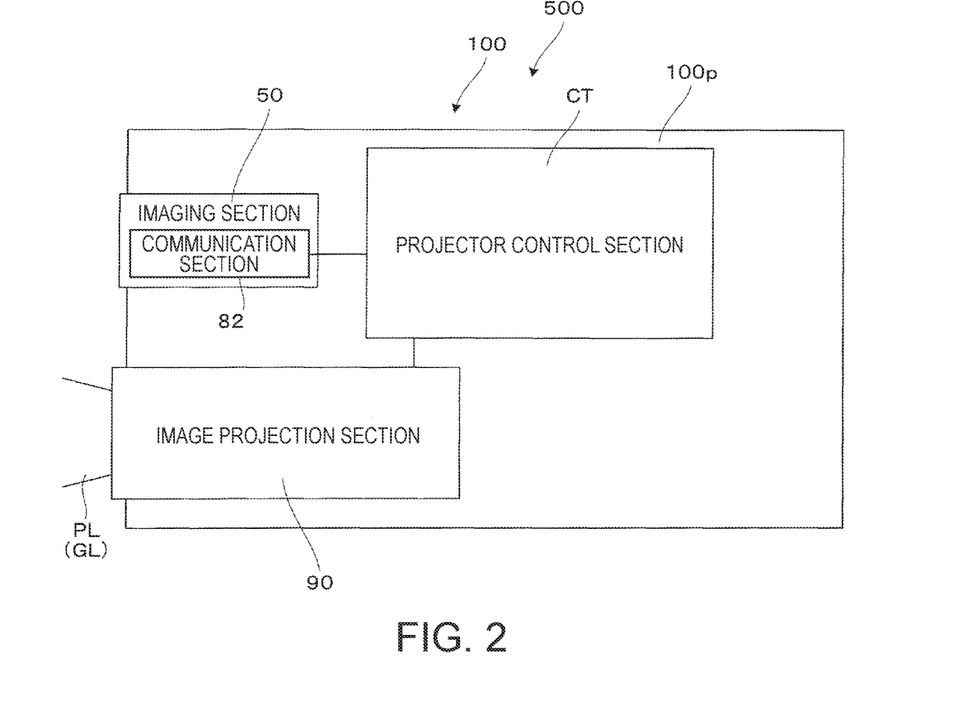
FIG. 2 is a block diagram showing a configuration of a projector system.

Although the detailed illustration is omitted, the projection main unit 100p is provided with a light source, a light modulation device, a projection optical system, and so on, and performs the image projection on the screen SC. Therefore, as shown in, for example, FIG. 2, the projection main unit 100p has an image projection section 90 including the projection optical system, and a projector control section CT, and the projector control section CT controls a variety of operations such as the image projection. Further, in particular, the projector control section CT makes it possible to receive the information from the imaging section 50, and makes so-called interactive image projection possible by correcting the content of the image to be projected based on the information from the imaging section 50.

The imaging section 50 takes the projection image projected by the projection main unit 100p to obtain the image information. Thus, the projection main unit 100p makes it possible to perform a calibration for associating the positional relationship between pixels of an image forming section (a pixel matrix in light modulation) constituting the projectionr main unit 100p and pixels of an imaging element 40, based on the image information obtained by the imaging section 50. Further, in the present embodiment, the imaging section 50 is arranged to be capable of capturing the light (the infrared light) in the wavelength band other than the image light of the visible light from the projection main unit 100p as the detected light in the actual use taking place after the calibration as already described above. As described above, the imaging section 50 is arranged to detect light in the wavelength band different between the calibration and the actual use taking place after the calibration. It should be noted that it is assumed here that the imaging section 50 is provided with an optical design so as to be suitable for the detection of the infrared light in the actual use focusing on the actual use. Specifically, it is assumed that it is designed that there is a state in which the focus is achieved in the range of the image taken by the imaging section 50 throughout the entire area of the irradiation target area PLa when detecting the wavelength band component of the infrared light.

Due to the configuration described above, the projector system 500 (or the projector 100) uses the calibration of associating the positional relationship between the pixels of the image forming section constituting the projection main unit 100p and the pixels of the imaging element 40 to thereby make the so-called interactive image projection possible.

Figure 3:
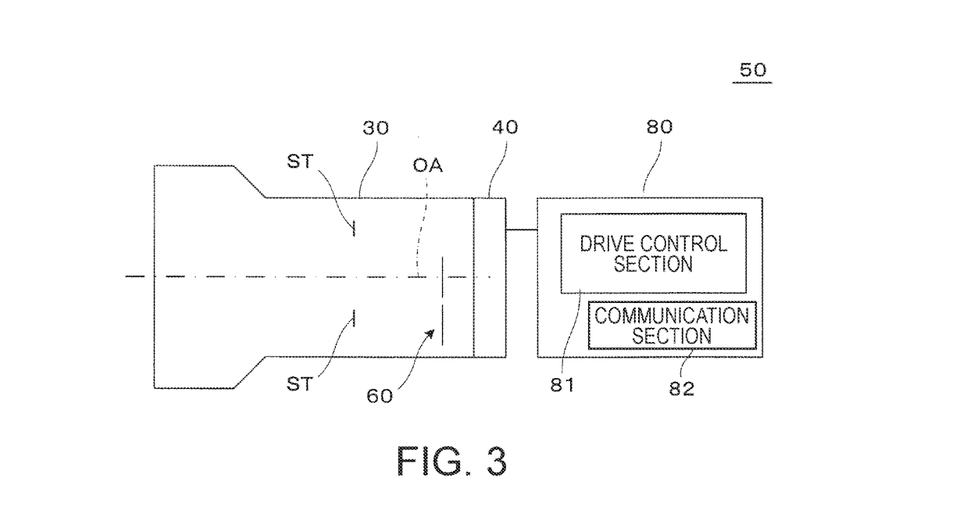
FIG. 3 is a diagram showing a configuration of an imaging section (an imaging device) according to the first embodiment.

Hereinafter, a configuration of the imaging section 50 (or the imaging device 50) will be described with reference to FIG. 3 and so on. As shown in FIG. 3, the imaging section 50 is to be installed in a projector, a monitoring camera or the like, and is provided with the imaging element 40 as a light receiving element, and a control device 80 besides the imaging lens system 30.

The imaging lens system 30 is for forming an image, which is located on an object, on the imaging element 40, and is configured by housing a plurality of lenses, an aperture, and so on in a lens tube section. It should be noted that an example of the constituents such as lenses as an essential parts of the imaging lens system 30 will be described later with reference to FIG. 4 and so on.

The imaging element 40 is formed using a solid-state imaging element such as a CCD image sensor or a CMOS image sensor. The imaging element 40 is a light receiving element capable of receiving and detecting the infrared light (IR light) in addition to the visible light.

The control device 80 controls overall the imaging section 50, and at the same time performs the communication and so on with the projector 100 equipped with the imaging section 50. Therefore, the control device 80 is provided with a drive control section 81 for performing drive control of the imaging element 40 and the imaging lens system. 30 constituting the imaging section 50, and a communication section 82 for performing the information communication process with the projector 100 (a projector control section CT). In this case, the imaging element 40 and the imaging lens system 30 are made to perform an imaging operation in accordance with the drive signal from the drive control section 81 of the control device 80, and are made possible to act in tandem with a variety of operations in the projector 100 equipped with the imaging section 50 via the communication section 82. Therefore, it is also possible to act in accordance with a command from a main device such as the projector.

It should be noted that the imaging section 50 can be what is incorporated as a part constituting the projector 100, but can also be what exists as the imaging device 50 as a separate body from the projector 100. It should be noted that it is conceivable that in order to play a role of the constituent for figuring out the projection image position of the projector 100, the imaging device 50 needs to be arranged that a lens system of a camera faces to a direction with an angle or the like corresponding a projection angle, a projection distance, and so on in the image projection by the projection main unit 100p, for example.

Here, if it is attempted to associate the image position of the pattern image PT shown by the pattern image light GL from the projection main unit 100p projected with, for example, visible light and the light emitting position of the infrared light IL from the pointing device such as the pen 70 (see FIG. 6) with each other using the information of the image taken by the imaging section 50, it is necessary to arrange that both of the pattern image light GL as the visible light and the infrared light IL can be captured without defocusing or the like. In this case, although it is also conceivable to, for example, make the imaging section (the imaging device) 50 so high in performance that the chromatic aberration can be suppressed in a broad wavelength band including the infrared wavelength band in addition to the visible wavelength band, there is a possibility that the price becomes extremely high, or the size of the imaging device becomes so large that the installation to the projector becomes difficult. In contrast, in the present embodiment, in the imaging section (the imaging device) 50, there is provided a configuration of the optical system making such a problem resolvable. Therefore, as already described, in the imaging section (the imaging device) 50 according to the present embodiment, as a premise, it is assumed that there is provided an optical design optimized for detection of the infrared wavelength band component in the practical use. Specifically, it is assumed that the imaging section 50 is designed to have the state in which the focus is achieved (with little blur) in the range imaged by the imaging section 50 throughout the entire irradiation target area PLa with respect to the infrared wavelength band component so that the detection sensitivity of the infrared light in the actual use becomes in good condition. Thus, it is assumed that it is arranged that the light emitting position of the infrared light IL from the pen 70 can accurately be captured in the actual use in the interactive state. It should be noted that in this case, regarding the pattern image light GL in the visible wavelength band different from the infrared wavelength band, imaging cannot necessarily be performed by the imaging section 50 capable of keeping the state with little blur. Therefore, in the present embodiment, in the imaging section 50, it is arranged that such a problem is resolved by adopting a configuration in which an optical filter for reducing the image light in the visible wavelength band such as the pattern image light GL, and at the same time, transmitting the detected light in a wavelength band other than the wavelength band of the image light so as to be able to be inserted and extracted, and an aperture for varying the f-number in accordance with the insertion and extraction of the optical filter is provided.

Hereinafter, a configuration of the imaging section (the imaging device) 50, in particular the optical system, will be described with reference to FIG. 4. In the case shown in the drawing, the imaging lens system 30 constituting the optical system of the imaging section (the imaging device) 50 according to the present embodiment is provided with a plurality of lenses (here, 8 lenses L11 through L18 as an example), an aperture ST, and an optical filter device 60.

The plurality of lenses L11 through L18 constitutes a fish-eye type lens, and has the half angle of view of, for example, no smaller than 70°, and are made sufficient for imaging the whole of the screen SC.

Figure 7:
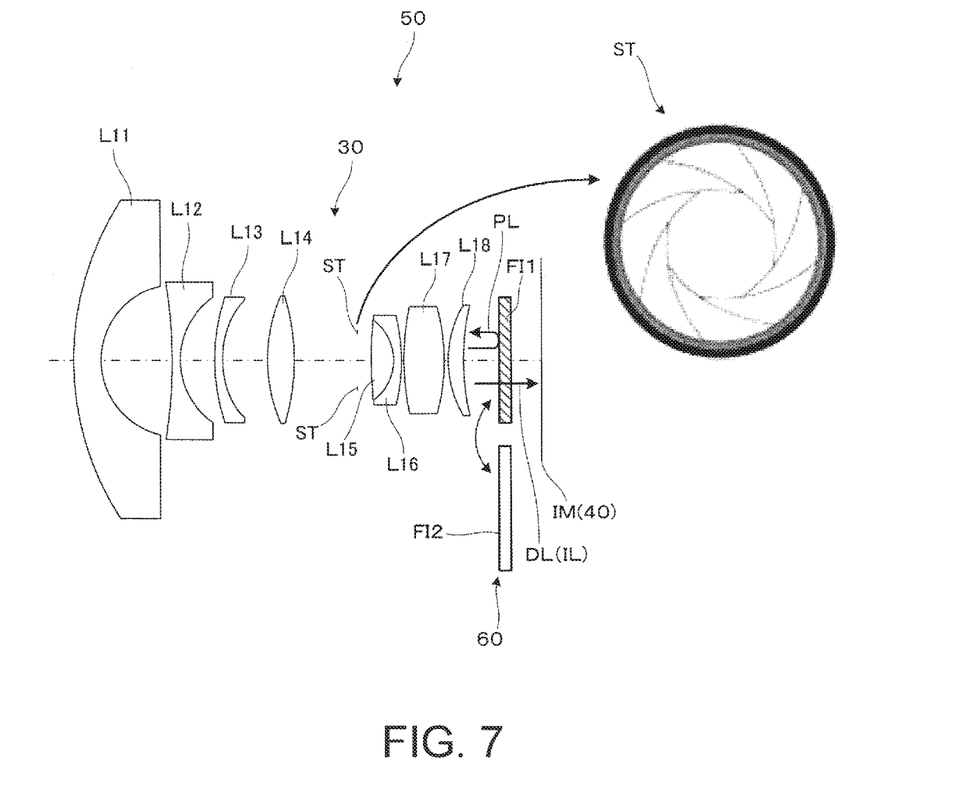
FIG. 7 is a diagram showing an appearance of the imaging section (the imaging device) in the image projection.

The aperture ST is typically disposed at the position where the light beam is most densely collected out of the spaces between the lenses L11 through L18, and controls the intensity of the light finally reaching an image surface IM (an image surface of the imaging element 40) passing through the lenses L11 through L18. In other words, the aperture ST varies the f-number (an aperture value). In particular, in the present embodiment, the imaging section 50 is provided with the optical design optimized for the infrared light as already described, and is, therefore, made difficult to achieve the focus in the calibration of capturing the pattern image light GL as the visible light, in other words, the light different in wavelength band from the infrared light, compared to the actual use of capturing the infrared light. In order to cope with the above, as shown in FIG. 4 in a partially enlarged manner, the aperture ST is closed in the calibration to thereby get to the state in which the f-number is made relatively large on the one hand, and as shown in FIG. 7, the aperture ST is opened in the actual use to get to the state in which the f-number is made relatively small on the other hand. In other words, the imaging section 50 decreases the opening diameter of the aperture ST to limit the light intensity to thereby increase the resolution to increase the depth of field the in the calibration. In other words, the aperture ST is a variable aperture for varying the aperture value between the pattern image light in the calibration and the detected light in the actual use, and varies (increases) the aperture value. Thus, it is arranged that the imaging section 50 prevents the axial chromatic aberration in imaging of the pattern image PT from occurring to make it hard to cause a blur even if the focal distance varies due to the imaging position, and in the case of imaging the whole of the pattern image PT, the state in which the focus is achieved is obtained in the entire imaging range. In contrast, regarding the period of the actual use (the period of the use in the interactive state), as already described, by performing the optimization in the optical design, the imaging section 50 for generally imaging the range of the irradiation target area PLa as the range in which the light emitting position of the infrared light IL is captured is arranged to be able to deal with the shift of the position even in the case in which, for example, the pen 70 moves to vary the light emitting position of the infrared light IL from moment to moment by increasing the opening diameter of the aperture ST to ensure the light intensity while keeping the state in which the focus is achieved in the entire imaging range. It should be noted that in the calibration, there is set the state in which the f-number is large, namely the dark state, but it is conceivable that the sufficient time for imaging can be taken compared to the period of the use in such an interactive state as described above, and it is conceivable that no major problem occurs even if the state is dark in some degree.

The optical filter device 60 has a first optical filter FI1 and a second optical filter F12, and makes each of the optical filters FI1, FI2 capable of being inserted and extracted between the lenses L11 through L18 and the image surface IM (the image surface of the imaging element 40) using a stepping motor, a pinion, and so on not shown.

Among the constituents of the optical filter device 60, the first optical filter FI1 is a visible light cut filter for cutting the light in the visible wavelength band, and at the same time transmitting the light in the infrared wavelength band. In other words, the first optical filter FI1 is a filter for reducing the image light in the visible wavelength band, and at the same time, transmitting the detected light in the wavelength band other than the wavelength band of the image light. The first optical filter FI1 is retracted outside the light path in the calibration as shown in FIG. 4, and is disposed in the light path in the actual use as shown in FIG. 7. Thus, the first optical filter FI1 shields the projection light PL in the visible wavelength band as the image light emitted from the projector 100, and at the same time transmits the light (the infrared light) outside the visible wavelength band to make it possible to detect the detected light DL in the imaging element 40 during the period of the actual use.

The second optical filter FI2 is a filter for transmitting only the light in the wavelength band of the pattern image light GL for forming the pattern image, and cutting the light in other wavelength bands. The second optical filter FI2 is disposed in the light path in the calibration as shown in FIG. 4, and is retracted outside the light path in the actual use as shown in FIG. 7. Thus, the second optical filter FI2 functions as a pattern image light transmission filter for making the detection of the pattern image light GL in the imaging element 40 possible in the calibration. It should be noted that regarding the second optical filter FI2, besides the above, it is possible to adopt the configuration in which the transmittance of the visible region, for example, becomes higher than the transmittance of the visible region of the first optical filter FI1.

The aperture ST varies the f-number in accordance with the insertion and the extraction of such a first optical filter FI1 and a second optical filter FI2 as described above as a result.

It should be noted that regarding the optical filters FI1, FI2, a variety of forms is conceivable, and it is typically conceivable to configure the optical filters FI1, FI2 by forming the films having such characteristics as described above on, for example, a glass substrate having a light transmissive property, respectively. Regarding the glass substrate, by adopting those having the thickness of, for example, one through several millimeters, it is possible to provide the strength durable for the insetion and extraction actions. Further, the first optical filter FI1 and the second optical filter FI2 are formed to have respective thicknesses equivalent to each other. In other words, the glass substrates described above are configured so as to have respective thicknesses equivalent to each other. It should be noted that regarding the optical filters FI1, FI2, it is not limited to one made of glass, but can also be one made of synthetic resin.

Further, since the insertion and the extraction of the optical filters FI1, FI2 in such an optical filter device 60 are performed by the exchange between the optical filters FI1, FI2 having such a configuration as described above, it becomes possible to reduce the difference in refractive state of the light reaching the imaging element 40 between the calibration and the actual use. In other words, it becomes possible for the imaging section 50 to take the image while suppressing the defocus on the optical axis in both of the calibration and the actual use.

The calibration operation for associating the pixels (the pixels on the light modulation side) on the projection main unit 100p side with the pixels (the pixels on the imaging element 40 side) on the imaging section (the imaging device) 50 side in the projector system 500 will hereinafter be described in detail with reference to FIG. 1 through FIG. 5.

Firstly, in the projection main unit 100p, the image projection section 90 projects the pattern image light GL for projecting the pattern image PT for the calibration on the screen SC in accordance with the control by the projector control section CT. Here, it is assumed that the association with the pixel matrix (the pixels of the light modulation) in the light modulation of the projection main unit 100p is achieved with respect to the pattern image PT projected so as to have a rectangular shape. Further, as already described, the pattern image light GL is the light in the green wavelength band, and the imaging section (the imaging device) 50 takes the pattern image PT projected on the screen SC (obtains the information of the pattern image light GL). Further, the imaging section 50 has the configuration described with reference to FIG. 2, FIG. 3, and FIG. 4 to thereby transmit the image information of the pattern image PT thus taken to the projection main unit 100p. The projection main unit 100p performs the association between the information of the pattern image PT obtained by the imaging section 50 and the information of the pixel matrix in the light modulation. FIG. 5 is a diagram for explaining an example of the association. Here, it is assumed that the pixel image PX1 shown in the left part of the drawing shows the pixel matrix in the light modulation in the projection main unit 100p, and corresponds to the pattern image PT on the screen SC. In contrast, the pixel image PX2 shown in the right part of the drawing shows the pixel matrix in the imaging element 40 as the light receiving element of the imaging section 50, and the image part PI obtained by taking the pattern image PT is captured in the pixel image PX2. The projection main unit 100p associates the pixels constituting the pixel image PX1 and the pixels of the part corresponding to the image part PI out of the pixel image PX2 with each other to thereby associate the positions of the pattern image PT taken by the imaging section 50 and the positions in the pixel matrix in the light modulation of the projection main unit 100p, namely the positions on the image projected, with each other. It should be noted that regarding the association between the pixels, due to the difference between the number of pixels of the pixel matrix on the projection main unit 100p side (the light modulation side) and the number of pixels of the pixel matrix in the imaging element 40, the difference in the number of pixels of the pixel matrix in the range represented by the image part PI, and so on, the simple one-to-one correspondence is not generally obtained. Therefore, a process for the association becomes necessary. For example, it is possible to perform the association pixel by pixel (e.g., it is possible to form a table for the association), or it is also possible to define a function for achieving the association, for example, to thereby make it possible to perform the process of the association.

As described hereinabove, the projection main unit 100p associates the image part PI representing the image projection positions out of the pixel image PX2 as the information of the pattern image PT obtained by the imaging section 50 and the pixel image PX1 representing the positions of the pixels of the light modulation with each other to thereby achieve the calibration. Thus, it becomes possible to identify the pointing position based on the detected light DL detected by the imaging section 50, and thus, the interactive image projection becomes possible.

Hereinafter, the operation in the image projection (in the actual use) of the projector system 500 will be described in detail with reference to FIG. 6 and FIG. 7. In particular, here, the operation in the image projection in an interactive situation will be described.

Firstly, as shown in FIG. 6, in this case, when the tip part TP of the pen 70 held by the user HU performing writing is pressed against the screen SC to set the pen 70 to the ON state to make the tip part TP emit light, namely the infrared light IL as the light in the wavelength band other than the wavelength band of the projection light PL is emitted from the tip part TP, a part of the infrared light IL enters the imaging section 50, and is detected as the detected light DL. As shown in FIG. 6 in a partially enlarged manner, when the detection of the detected light DL is performed in the imaging section 50, and further, the detection result is transmitted to the projection main unit 100p, the projection main unit 100p performs the image projection corresponding to the points corresponding to the light emitting position (the light emitting point) of the tip part TP based on the association by the calibration described above. Specifically, the projection main unit 100p identifies the position of the pattern image PT indicated by the dotted line (not shown in the actual use shown in FIG. 6) corresponding to the image projection position based on the information of the pattern image light obtained by the imaging section 50 in the calibration, and the light emitting position of the detected light DL detected by the imaging section 50 in the actual use in the interactive situation, and then performs the image projection reflecting the information of the light emitting position. Specifically, as shown in FIG. 6 in a partially enlarged manner, the identified position TPx as the light emitting position of the detected light DL detected on the image is made to correspond to a position on the pattern image PT due to the association in the calibration, and the image display of the state in which the position is drawn on the assumption that the tip part TP exists at that position. It should be noted that a variety of types of image processing are performed in, for example, the projector control section CT so that such an operation as described above is performed.

Further, as shown in FIG. 7, in the detection operation described hereinabove, it is assumed that in the imaging section 50, the projection light PL as the light in the visible wavelength band is shielded by, for example, reflection while the infrared light IL as the light outside the visible wavelength band is transmitted in the first optical filter FI1 to thereby make it possible to detect the infrared light IL as the detected light DL in the imaging element 40.

Figure 8:
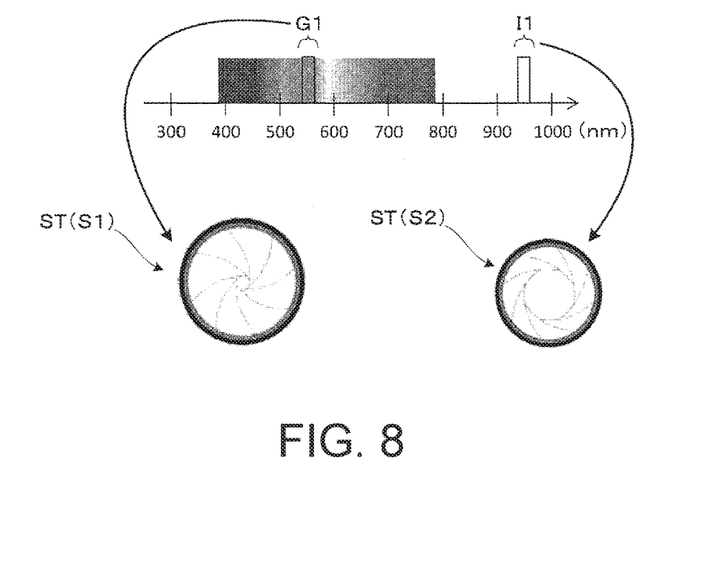
FIG. 8 is a diagram showing conditions of an aperture in the calibration and the image projection, respectively.

The situation of the light reception in the imaging section 50 in the calibration and the image projection (the actual use) in the interactive situation will hereinafter be described with reference to FIG. 8 and FIG. 9. FIG. 8 is a diagram showing the state (S1) of the aperture ST in the calibration and the state (S2) of the aperture ST in the image projection in the present embodiment. Further, FIG. 9 is a diagram showing the relationship between the axial chromatic aberration of the light reaching the imaging element 40 passing through the aperture ST in the calibration and in the image projection in the present embodiment, and the axial chromatic aberration in the comparative example.

Firstly, as shown in FIG. 8, and as already described, in the present embodiment, in the calibration, the component of the green wavelength band G1 out of the projection light PL from the projector 100 is used (emitted) as the pattern image light GL. On this occasion, the aperture ST is closed (S1). In other words, the f-number is large, and the light intensity of the light which can pass through the aperture ST is low. Therefore, the component which can pass through the aperture ST out of the pattern image light GL also decreases.

In contrast, in the actual use, the component in the infrared wavelength band I1 from the pen 70 is used (emitted) as the infrared light IL (the detected light DL). On this occasion, the aperture ST is opened (S2). In other words, the f-number is small, and the light intensity of the light which can pass through the aperture ST is high. Therefore, even the faint infrared light IL can reliably be detected as the detected light DL.

Figure 9:
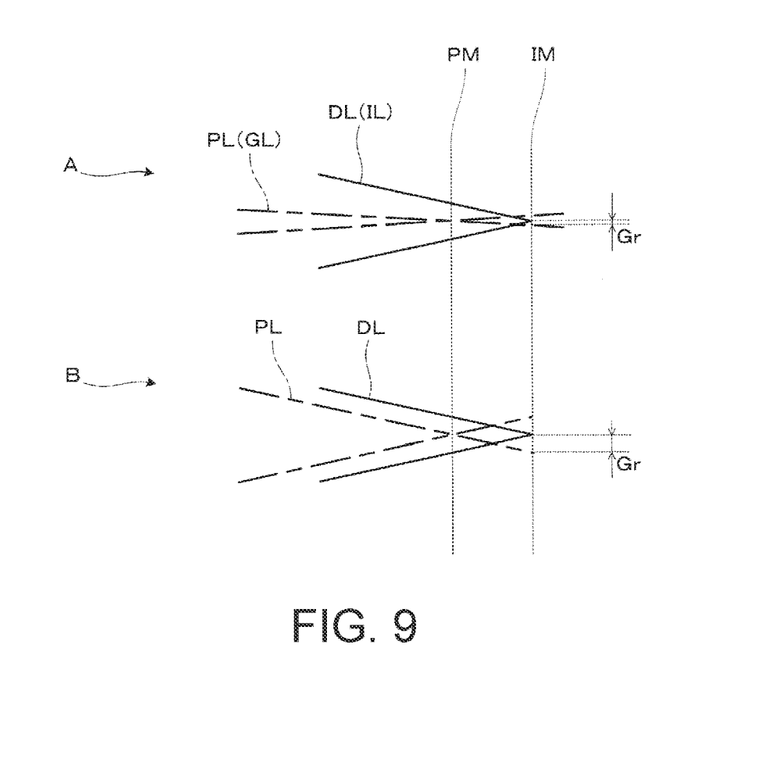
FIG. 9 is a diagram showing a relationship between the axial chromatic aberration in the embodiment and the axial chromatic aberration in a comparative example.

Here, as shown in FIG. 9 as the light beam chart A, firstly, in the present embodiment, the image formation on the image surface IM of the imaging element 40 is designed so that the imaging performance (resolution) of the infrared light IL, which should in principle turn to the detected light DL, becomes the highest. In other words, the basic design of the lenses and so on is made so that the imaging position of the infrared light IL coincides with the image surface IM, or becomes in the approximate state so as to obtain the structure for reliably detecting the infrared light IL during the image projection including the interactive situation and so on. In this case, as shown in the drawing, the pattern image light GL different (in the green wavelength band) in wavelength band from the infrared light IL is shifted in the imaging position PM, where the imaging performance becomes the highest, from the position on the image surface IM, as a result. In the present embodiment, in expectation of this fact, when detecting the pattern image light GL, by varying (increasing) the f-number, the spot diameter Gr of the pattern image light GL on the image surface IM is prevented from increasing as shown in the drawing. In other words, by increasing the f-number, it is arranged that the image in which the axial chromatic aberration is prevented from occurring, and thus, little blur is included is obtained even if the imaging position is shifted in some degree. In this case, it is possible to make it difficult to cause a blur even if the focal distance changes due to the imaging position, in other words, it is possible to suppress the blur not only on the optical axis of the imaging element 40 but also at other positions. It should be noted that in the case of attempting to suppress defocusing by inserting a glass substrate or the like as a substitution when retracting the optical filter from the light path as in Document 1 and the optical filter device 60 in the present application, there is a possibility that the focal position is not aligned in other positions than on the optical axis to cause blurs although the focal position is adjusted to be aligned on the optical axis, for example. In contrast, in the present application, by suppressing the generation of the axial chromatic aberration in the aperture ST as described above, the imaging performance of the pattern image light GL entering the imaging element 40 is improved not only on the optical axis but also at other positions.

Compared to the case described hereinabove, as in the comparative example shown as the light beam chart B in FIG. 9, if the light beam in the similar state to the infrared light IL (the detected light DL) is received by the imaging element 40 without varying the f-number at the time of imaging the pattern image light GL, the spot diameter Gr of the pattern image light GL becomes large, and the blurred image large in axial chromatic aberration is recognized, and it is conceivable that the accuracy of the calibration is deteriorated as a result. In order to prevent such a chromatic aberration from occurring, it is conceivable to suppress the chromatic aberration with, for example, the optical design, but the burden of the optical design side increases as a result. In particular in the case of the configuration described above, since there arises the necessity of making the light superior in the chromatic aberration in both of the visible wavelength band and the infrared wavelength band, it is conceivable that there is a high possibility that the application of the glass material high in price and the increase in the number of lenses occur when providing the configuration for the aberration correction such as achromatizing lenses. In contrast, in the present embodiment, it is possible to dramatically reduce the burden of the optical design.

It should be noted that in the case of the configuration of the present embodiment, it results that the taken image of the imaging section 50 in the calibration of projecting the pattern image light GL becomes dark. However, in the calibration, there is no need to follow the content of the projection image varying one after another as in the case of the image projection in the interactive situation, and it is conceivable that it is possible to ensure the sufficient exposure time and so on even in the imaging in the state with the large f-number (the dark state), and it is hard to cause a problem.

As described hereinabove, in the imaging device (the imaging section) 50 according to the present embodiment and the projector system 500 incorporating the imaging device (the imaging section) 50, since the optical filters FI1, FI2 constituting the optical filter device 60 are inserted and extracted in the imaging section 50, it is possible to prevent entering of the light in the wavelength band other than that of the detected light DL while capturing the detected light DL with the necessary light intensity, for example, and ensure the writing operation on the projection screen, namely the operation of the interactive projector. On this occasion, by the aperture ST varying the f-number in accordance with the insertion and the extraction of the optical filters FI1, FI2, it is possible to suppress the axial chromatic aberration caused by the difference in wavelength band between the pattern image light GL as the image light and the detected light DL to achieve an improvement in accuracy of the alignment (the calibration).

Second Embodiment

An imaging device and a projector system incorporating the imaging device according to a second embodiment of the invention will hereinafter be described with reference to FIG. 10. In the present embodiment, since the configuration is substantially the same as in the case of the first embodiment except a part of the configuration of the imaging section (the imaging device) 250, regarding the configuration other than the configuration of the imaging section (the imaging device) 250, the description and the illustration will be omitted.

Figure 4:
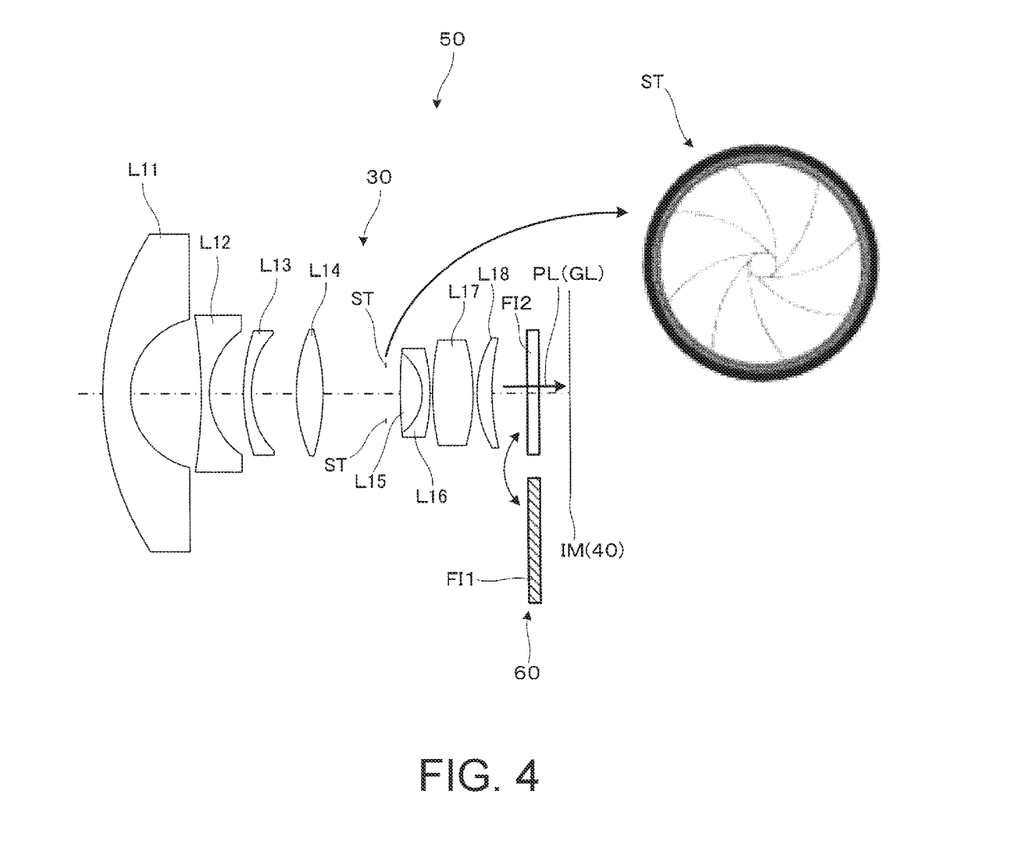
FIG. 4 is a diagram showing an optical system constituting the imaging section (the imaging device), and is a diagram showing an appearance in the calibration.
Figure 5:
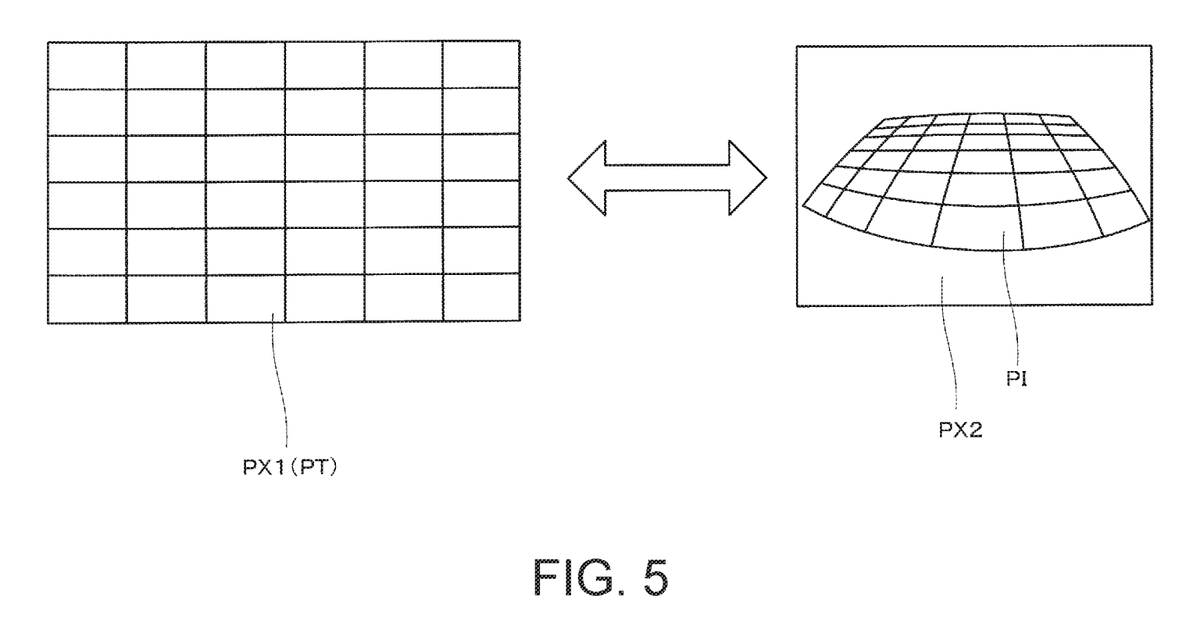
FIG. 5 is a diagram for explaining association for the calibration.
Figure 10:
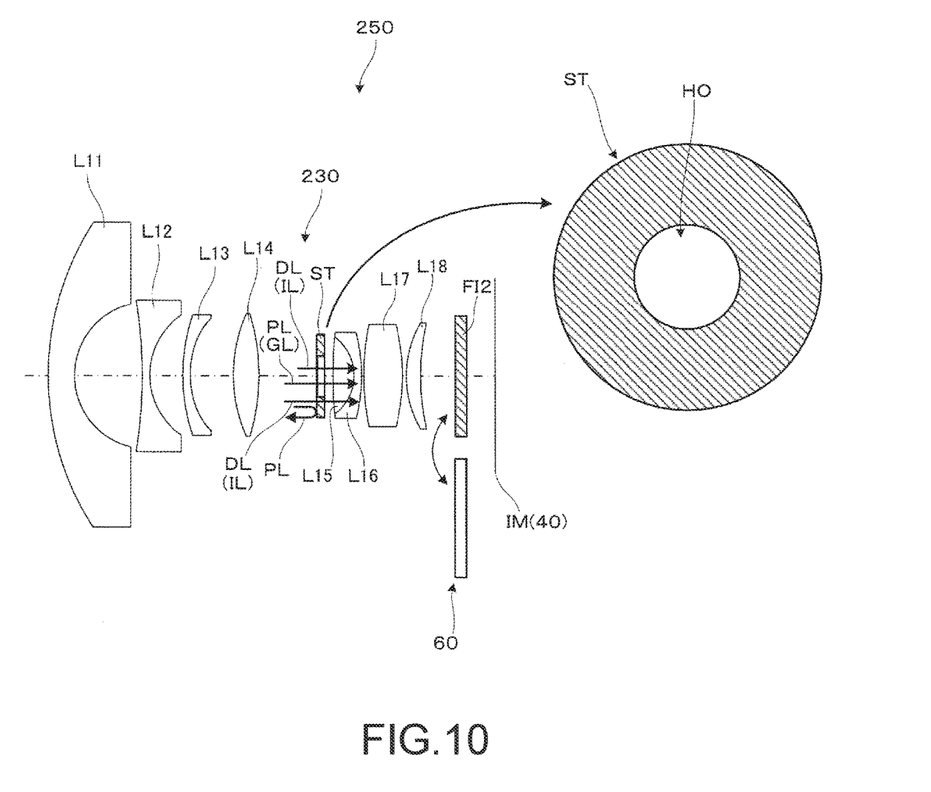
FIG. 10 is a diagram showing a configuration of an imaging section (an imaging device) to be incorporated in a projector system according to a second embodiment.

FIG. 10 is a diagram showing the configuration of the imaging section (the imaging device) 250 to be incorporated in the projector system according to the present embodiment, and is a diagram corresponding to FIG. 7 or FIG. 4. As shown in the drawing, the imaging section (the imaging device) 250 according to the present embodiment is provided with the imaging element 40 and so on as the light receiving element besides the imaging lens system 230 similarly to the imaging section (imaging device) 50 shown in FIG. 7 and so on, and the imaging lens system 230 is provided with the plurality of lenses L11 through L18, the aperture ST, and the optical filter device 60. Among these constituents, the present embodiment is different from the first embodiment in the point that the aperture ST is a fixed aperture. In the more detailed description, in the present embodiment, the aperture ST is a member having a ring-like shape with a hole section HO at the center, and at the same time having a plate-like shape as shown in FIG. 10 in a partially enlarged manner, and shields the light in the wavelength band of the projection light PL or the pattern image light GL while transmitting the light in the wavelength band of the detected light DL. Specifically, by adjusting the size of the hole section HO and the shape of the aperture ST, it is possible to transmit the detected light DL through the whole of the aperture ST on the one hand, and by limiting the range for transmitting the projection light PL (the pattern image light GL) to the range of the hole section HO, the f-number is virtually varied to realize the desired state in accordance with the wavelength band even with the fixed aperture. Thus, similarly to the case of the first embodiment, by the aperture ST varying the f-number between imaging the pattern image light GL as the image light in the calibration and detecting the detected light DL as the infrared light IL, it is possible to suppress the axial chromatic aberration caused by the difference in wavelength band between the pattern image light GL and the detected light DL to thereby achieve the improvement in the accuracy of the alignment (the calibration).

Other Issues

The invention is not limited to the embodiments described above, but can be put into practice in various forms within the scope or the spirit of the invention.

For example, it is also possible to separately dispose a device (a device for scanning the surface with the infrared light so as to irradiate the surface in a curtain manner) for irradiating the surface of the screen and the periphery of the screen with the infrared beam so as to cover the surface of the screen and the periphery of the screen as shown in JP-A-2015-159524, and use a method of capturing the reflected light as the infrared light reflected by an object appearing in the periphery of the screen together with the method of the invention. It is conceivable to detect the tip or the like by analyzing the image area of the imaging device corresponding to the position captured by detecting the reflected light (the infrared light), for example.

Figure 11:
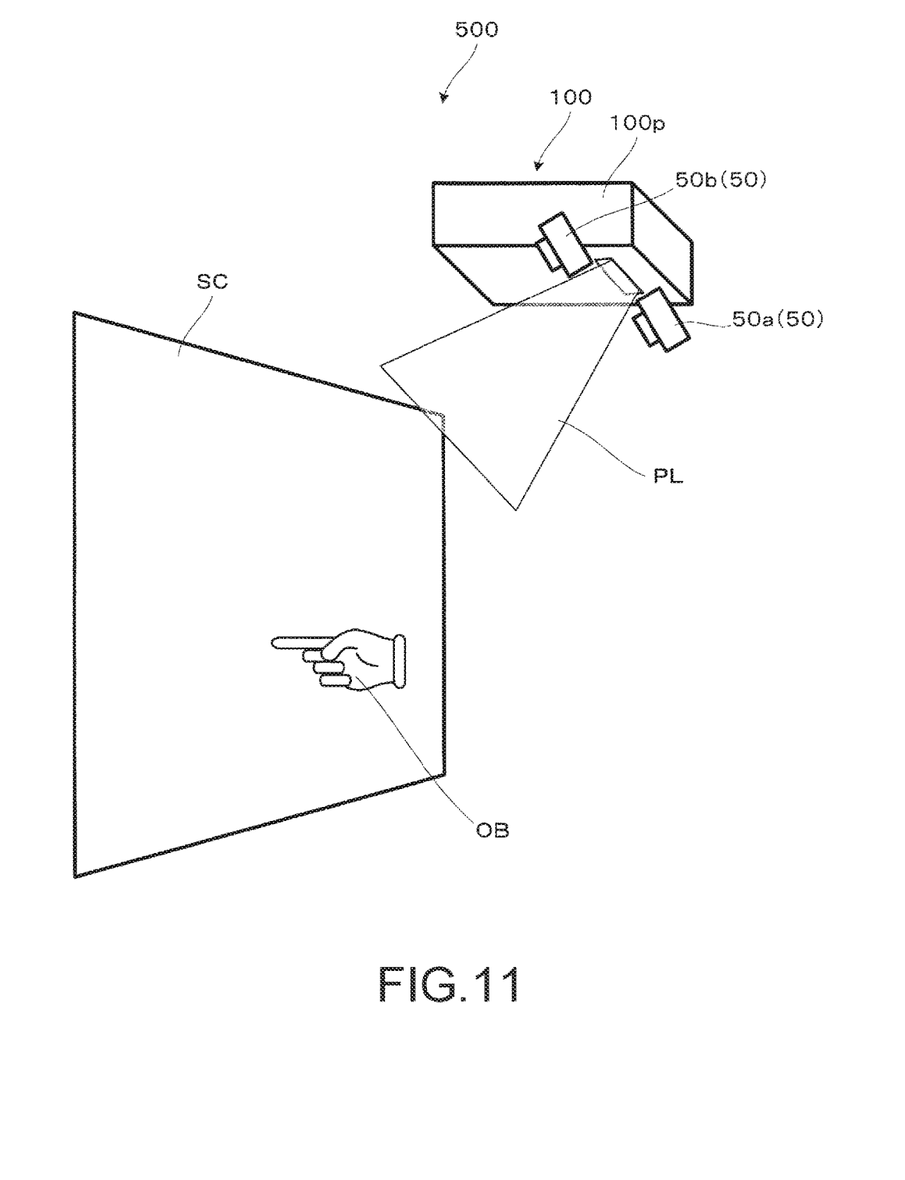
FIG. 11 is a diagram showing a general configuration of a projector system according to a modified example.

Further, it is also possible to assume that the projector system is constituted by two (or more) imaging sections 50a, 50b as in a modified example of a schematic configuration of the projector system shown in FIG. 11, for example. It should be noted that it is assumed that these imaging sections 50a, 50b each have substantially the same configuration as the imaging section 50 in the first embodiment, for example. By providing the two imaging sections 50a, 50b, it is possible to obtain parallax information (or a stereoscopic image). In other words, by installing the two imaging devices, more sophisticated position detection with stereoscopic viewing becomes possible. In this case, for example, the projector control section CT (see FIG. 2) makes the image projection section 90 (see FIG. 2) project the image reflecting the position information of the object OB (e.g., a fingertip of the user) detected from the parallax information based on the image information (the detected light as the infrared light) obtained by imaging in the imaging sections 50a, 50b to thereby make the interactive image projection possible. Further, it is also possible to assume that three or more imaging devices are provided.

Further, although in the above description, it is assumed that a variety of types of processes are performed by the projector control section CT or the PC connectable to the projector 100, regarding the processes to be assumed, a variety of configurations are possible, and it is conceivable to, for example, make the PC side perform the process of identifying the image projection position based on the information of the projection light PL obtained by the imaging section 50, and the position based on the detected light DL detected by the imaging section 50. In other words, it is also possible to assume that the image projection position and the light emitting position in the projector control section CT are identified, and a part or the whole of the control of the image projection based on the positional relationship thus identified is performed by externally connected equipment such as the PC (the PC or the like constitutes the projector control section). Further, in contrast, it is also possible to adopt a configuration (a PC-less configuration) of making the projector control section CT assume all of the processes without connecting the PC and so on.

Further, although in the above description, it is assumed that the pattern image PT is projected with the pattern image light GL formed of the light in the green wavelength band, the light used for the projection of the pattern image PT is not limited to the light in the green wavelength band, but it is also possible to use the light in other wavelength bands. In this case, it is conceivable to variously change the characteristic of the second optical filter F12 in the optical filter device 60 accordingly.

Further, in the optical filter device 60, regarding the second optical filter FI2, it is possible to use the glass substrate alone without providing the film having the transmissive property, and can also be substituted by a member for transmitting light throughout at least the entire visible wavelength band. Further, in the case in which the defocusing on the optical axis of the imaging element 40 can sufficiently be reduced despite the difference between presence and absence of the glass substrate, for example, it is conceivable to adopt a configuration in which the first optical filter FI1, which can be inserted and extracted, is provided alone without providing the second optical filter FI2, and nothing is disposed at the installation position of the filter in the period (the calibration period) in which the image projection is not performed.

Further, although in the above description, the adjustment of the intensity of the light to be transmitted is achieved by adopting the variable aperture as the aperture ST in, for example, the first embodiment, it is also conceivable to adopt a configuration in which, for example, the aperture ST can be replaced.

Further, it is also possible to constitute the imaging element 40 as the light receiving element by an element capable of receiving only the light in the green wavelength band corresponding to, for example, the pattern image light GL, and an element capable of receiving only the light in the infrared wavelength band corresponding only to the infrared light IL (the detected light DL).

Further, although in the above description, the illustration and the detailed description of the light source, the light modulation device, the projection optical system and so on constituting the projection main unit 100p are omitted, a variety of configurations can be applied. For example, regarding the light source and the light modulation device, an LED light source and a laser source can be used as the light source besides a high-pressure mercury lamp or the like, further an organic EL (O-LED) can also be applied, and in particular, in the case of applying the organic EL element as the light source, it is possible to configure the device as a video device also having the role of the light modulation. Further, regarding the light modulation device, there are conceivable a variety of configurations such as the configuration of the light modulation device formed of a reflective liquid crystal panel, a digital micromirror device, or the like besides the transmissive liquid crystal panel.

The entire disclosure of Japanese Patent Application No. 2016-190770, filed Sep. 29, 2016 is expressly incorporated by reference herein.

What is claimed is:

1. A projector system comprising:
 a projection main unit adapted to project image light obtained by modulating light from a light source; and
 an imaging section having an optical filter, which can be inserted and extracted, adapted to reduce the image light from the projection main unit and transmit detection light in a wavelength band other than a wavelength band of the image light, and an aperture adapted to vary an f-number in accordance with the insertion and the extraction of the optical filter.

2. The projector system according to claim 1, further comprising:
 a projector control section adapted to identify an image projection position based on information of image light obtained by the imaging section, and a light emitting position of the detection light detected by the imaging section, and perform control of image projection based on a positional relationship identified.

3. The projector system according to claim 1, wherein the projection main unit performs image projection reflecting information of the light emitting position of the detection light detected by the imaging section.

4. The projector system according to claim 1, wherein the projection main unit projects the image light adapted to project a pattern image, and performs a calibration adapted to associate pixels of light modulation of modulating the light from the light source and pixels of a light receiving element of the imaging section with each other based on information of the imaging section receiving the image light of the pattern image.

5. The projector system according to claim 4, wherein the aperture increases the f-number at the time of imaging the image light of the pattern image in the calibration to be larger than the f-number at the time of detecting the detection light in the image projection.

6. The projector system according to claim 1, wherein the aperture is a variable aperture adapted to vary an aperture value between the image light and the detection light.

7. The projector system according to claim 1, wherein the aperture is a fixed aperture adapted to shield light in the wavelength band of the image light and transmit light in the wavelength band of the detection light.

8. The projector system according to claim 1, wherein the imaging section detects light in an infrared wavelength band as the detection light in the wavelength band other than the wavelength band of the image light.

9. The projector system according to claim 8, wherein the optical filter is a visible light cut filter inserted in the image projection, and adapted to shield the image light and transmit the detection light.

10. An imaging device adapted to take an image of image light adapted to project a pattern image, and an image of detection light in a wavelength band other than a wavelength band of the image light, the imaging device comprising:
 an optical filter, which can be inserted and extracted, adapted to reduce the image light and transmit the detection light; and
 an aperture adapted to vary an f-number in accordance with the insertion and extraction of the optical filter.

* * * * *